March 26, 1935. E. R. FISH 1,995,738
CLUTCH ASSEMBLING MACHINE
Filed Jan. 21, 1933 3 Sheets-Sheet 1

INVENTOR:
Earl R. Fish,
BY
Bodell & Thompson
ATTORNEYS.

March 26, 1935.  E. R. FISH  1,995,738
CLUTCH ASSEMBLING MACHINE
Filed Jan. 21, 1933  3 Sheets-Sheet 3
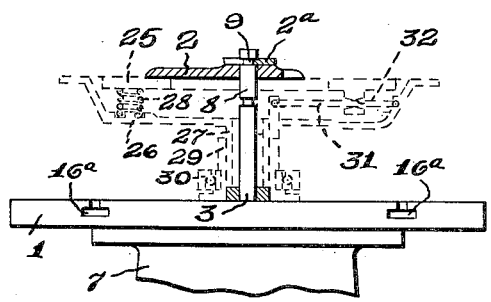
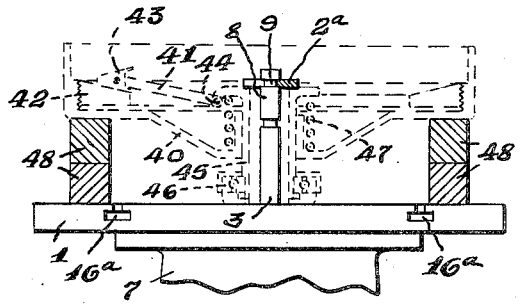
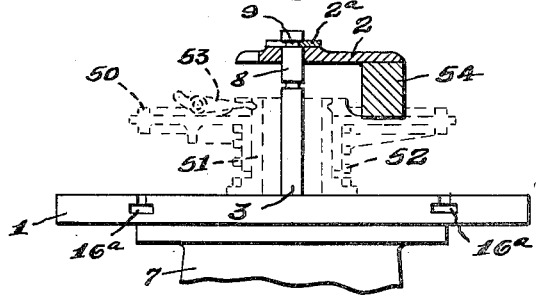
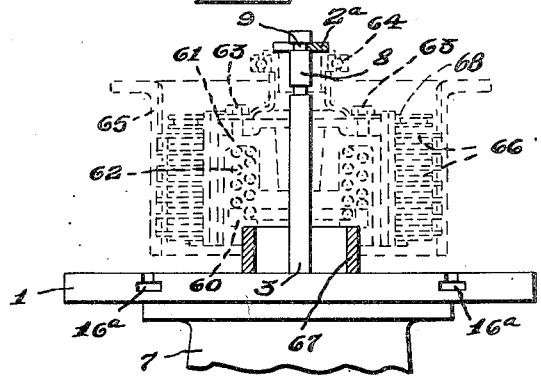
INVENTOR:
*Earl R. Fish*,
BY
*Bodell & Thompson*
ATTORNEYS.

Patented Mar. 26, 1935

1,995,738

UNITED STATES PATENT OFFICE 1,995,738

CLUTCH ASSEMBLING MACHINE

Earl R. Fish, Syracuse, N. Y., assignor to W. C. Lipe Inc., Syracuse, N. Y., a corporation of New York Application January 21, 1933, Serial No. 652,838

1 Claim. (Cl. 29—89)

This invention relates to machines for assembling clutches, such as are used in automobiles between the engine and the transmission gearing, and has for its object, a machine which can be readily adapted to assemble different types and sizes of automotive clutches, and is equally adapted to assemble the different types and sizes and as fast in operation as assembling machines built for that particular type or size.

It further has for its object, a clutch assembling machine in which the clamping member for compressing the clutch spring or springs in assembled position is readily operated by an operating member which does not interfere with the removal and replacement of the clamping member.

It further has for its object, a simple gage means for determining, when assembling, the position of the cover plate or spring abutment, and also a simple and efficient mounting for a gage for determining the initial position, or the adjustment of the clutch levers, which gage is readily interchangeable with the clamping member utilized to initially compress the parts of the clutch in assembling them.

It further has for its object, a clutch assembling machine which is particularly simple and economical in construction, rapid in operation, readily adapted to different sizes and types of clutches, and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 4 is an enlarged fragmentary detail view on line 4—4, Figure 2.

Figure 3:
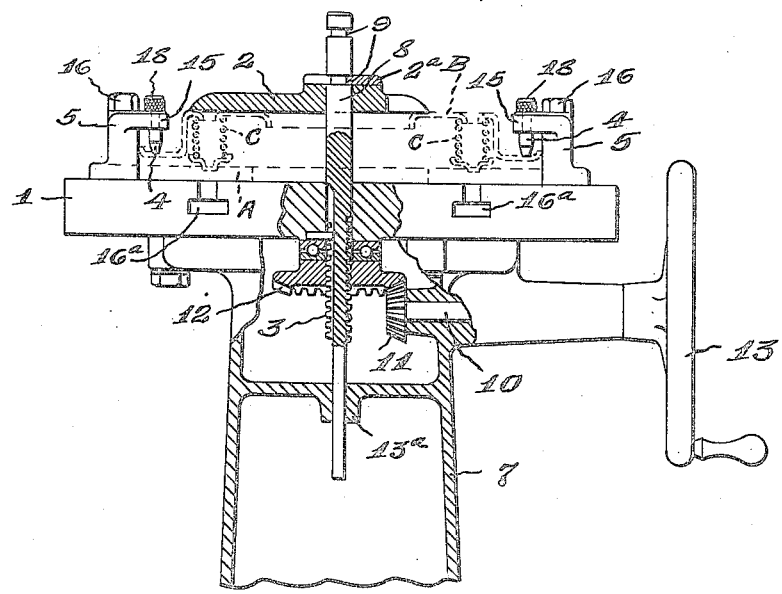
Figure 3 is a vertical fragmentary, sectional view showing the machine with the clamping member applied thereto.

Figures 5, 6, 7, and 8 are views similar to Figure 3 illustrating the operation of the machine on different types of clutches.

Clutch manufacturers have machines and fixtures for assembling clutches, but these machines are individual, and each primarily designed to work most efficiently with a particular type and size of clutch, and are not flexible or readily adaptable to assemble types and sizes other than the ones they are specially built for. My machine is designed to be flexible or readily adaptable at will to different sizes and types of clutches for the purpose of initially assembling them, and also for reassembling them after the clutches have been repaired.

The general types of clutches for which this machine is adapted are those embodying two opposing elements between which the clutch spring or springs are interposed. It operates to compress or unload the springs from the parts on which they operate, to disassemble the clutch or reassemble or assemble the clutch, so that after assembling the spring can be released or when disassembling the other parts of the clutch can be removed while relieved of the spring pressure. Some types of clutches as those embodying levers and a plurality or annular series of clutch springs require some means for holding the springs compressed while removing or replacing the levers.

In the drawings, the clutch is shown in dotted lines, as it forms no part of the invention.

A designates the pressure ring; B the spring abutment or cover plate; C the springs interposed between the abutment and the pressure ring, and D the clutch levers fulcrumed at E on the abutment and acting on the pressure ring through studs F projecting rearwardly from the pressure ring, the levers acting against adjustable shoulders, or nuts G, threading on the studs, these being adjustable to bring the inner ends H of the levers in the same plane, or in like position to the throw-out collar, or mechanism of the clutch, not shown, it being understood that it is necessary that all the levers receive the pressure at the same time or all the levers must work in substantially exact unison in the same plane.

The machine includes a face plate or table 1 against which one of the elements against which the spring thrusts is placed, a clamping member 2 opposed to the face plate and when actuated serving to compress the springs, a non-rotatable spindle 3 extending through the face plate from the lower side thereof to extend axially through the clutch, on which spindle the clamping member is mounted, the spindle being movable axially and a prime mover located below the face plate or table or on the opposite side thereof to that on which the clutch is mounted and connected to the spindle to move it endwise. It further includes for some types of clutches, gage pins 4 for determining the amount of reaction of the springs, when the clamping member is released, and hence, the initial position of the spring abutment or cover plate, these gage pins being for the type of clutches shown in Figures 1 and 3.

The spindle is usually an endwisely slidable, non-rotatable screw, and the gage pins are supported on carriers or adjustable brackets 5 supported by the face plate and shiftable to carry the pins into and out of overhanging relation to the spring abutment or cover.

The machine further includes for clutches in which the clutch levers are adjustable a gage sleeve 6 interchangeably mountable with the clamping member 2 on the spindle and supporting a gage having a finger for coacting with the ends of the levers D to determine the amount of adjustment required in order that the levers may act equally on the pressure plate. Owing to the sliding spindle which operates the clamping member, no rotary force is applied to the clutch being operated on.

The face plate 1 is here shown as a table supported by a suitable hollow pedestal 7, the face plate being provided with a series of concentric circles with which the inner edges of the different size pressure plates can be alined for initially centering the pressure ring on the face plate. The screw 3 extends axially through the face plate, and is provided with a portion 8 for receiving a hub opening in the clamping member 2, and with an annular groove 9 for receiving a U washer 2ª to lock the clamping member on the screw, the U washer being movable laterally relatively to the screw into and out of operative position. The clamping member is here shown as a spider having a plurality of arms, the ends of which press on the spring abutment B.

The screw 3 is slidably keyed in the table, or face plate, to hold it from turning movement and permit endwise sliding movement thereof, and is actuated by means of a horizontal shaft 10 mounted in a bearing below the table 1 and having a gear 11 at its inner end meshing with a gear 12 threading on the screw, and held from endwise movement in any suitable manner. The shaft 10 is operated by means of a suitable hand wheel 13. The screw has a pilot bearing at its lower end at 13ª.

In the operation thus far described, the clutch parts are placed in position on the face plate 1, the clamping member attached to the screw 3 by means of the U washer, and the hand wheel turned bringing the clamping member down onto the spring abutment, compressing it and the springs beyond the point desired in the finished assembly, and then, gage pins 4 are selected and set to determine the rearward movement of the abutment B under the reaction of the springs C when the clamping member is released, and removed.

Thus, the initial setting of the spring abutment or cover is determined by the gage pins and the springs are under actual working conditions when the levers are adjusted and there is no variation in the conditions when the clutch is removed from the machine and assembled in the fly wheel of the engine.

There is a set of gage pins 4 provided for each type or size of clutch, and these are merely mounted in open ended slots 14 in laterally extending arms 15 of the brackets 5, and the brackets are secured to the base plate by bolts or screws 16 extending therethrough and threading into slides or nuts located in radial undercut ways, or T slots 16ª in the face plate. Hence, after the clutch assembly has been compressed, the proper gage pins are placed in the brackets 5 and the brackets slid radially in their ways until the pins overhang the margin of the abutment, so that after the clamping member is released, the springs C will react to bring the abutment against the gage pins. The pins have shoulders 17 which thrust against the lower faces of the arms 15 on opposite sides of the slots 14 and are held from displacement by nuts 18 threading on their upper ends against the upper faces of the arms 15.

The clamping member is then removed from the screw, and the sleeve 6 applied, this abutting against the face plate and the gage 19 adjustable along the sleeve until its finger member 20, when the gage is in zero position, contacts the ends of the levers. Any of the levers, which operate the indicator out of zero position, are adjusted by means of the nuts G until the gage indicates zero. The sleeve 6 is rotatable about the screw to bring the gage into juxtaposition to the levers. The gage is held in its adjusted position on the sleeve by a split bearing 21 embracing the sleeve and clamped therein by a screw 22.

Figure 1:
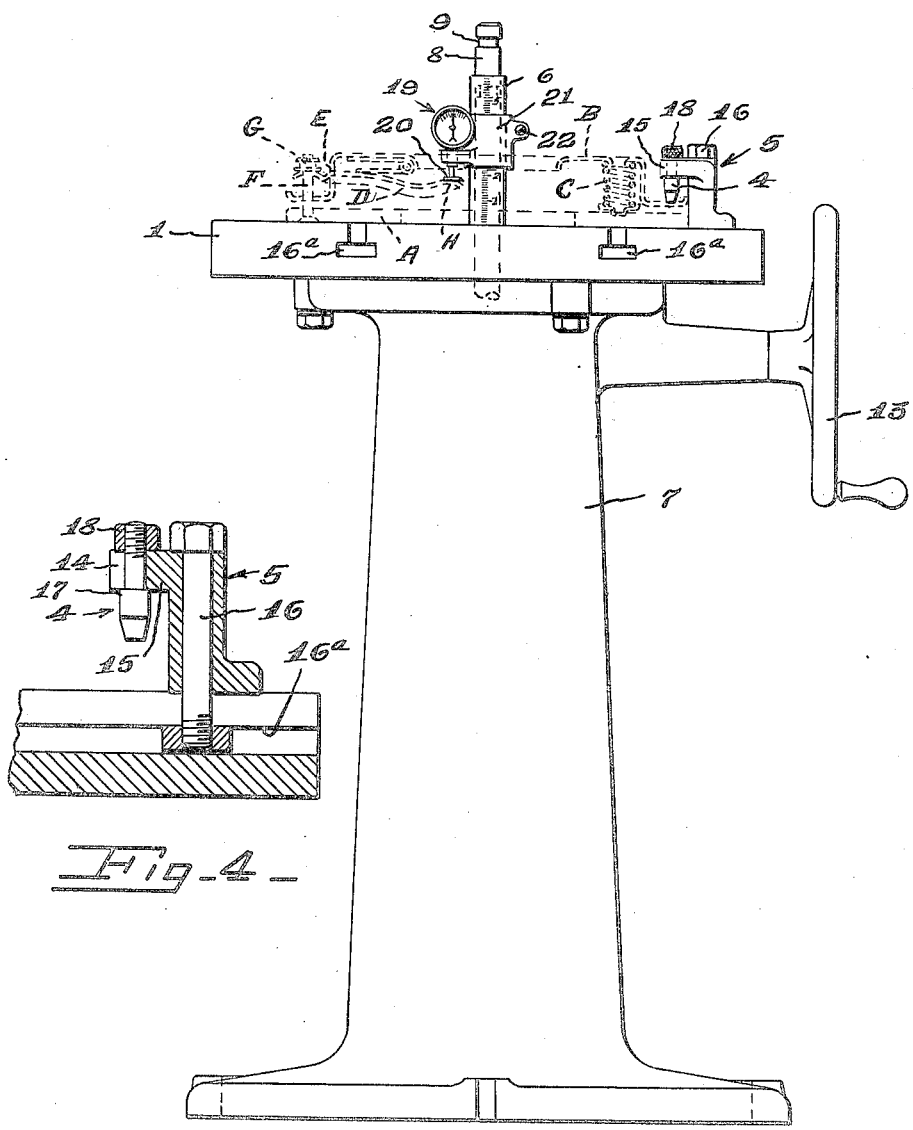
Figure 1 is an elevation of this machine, a clutch being shown in dotted lines.
Figure 2:
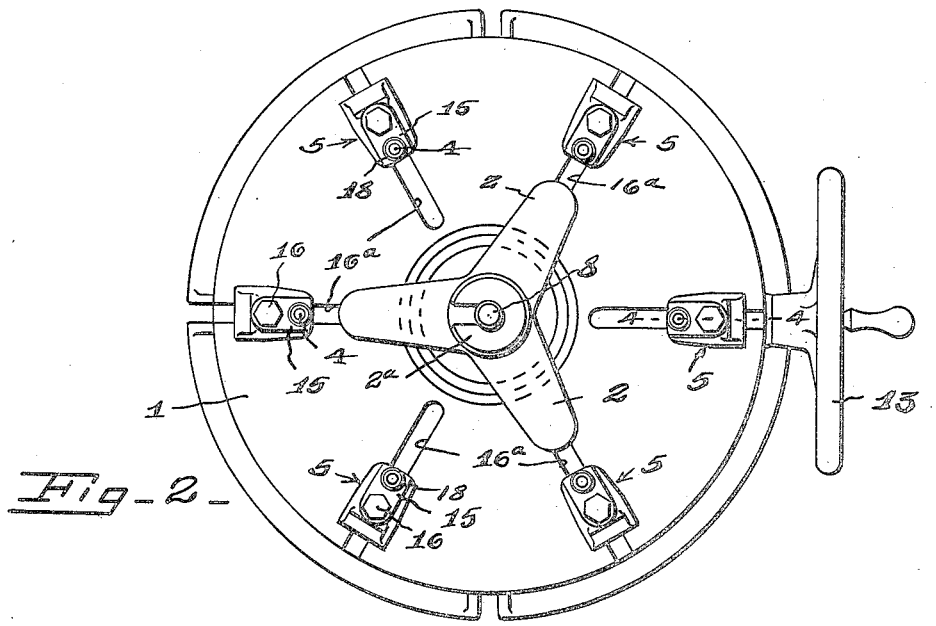
Figure 2 is a plan view, the clutch being omitted.

In Figure 5, the machine is shown as operating on a clutch of the type in which the levers have no adjustment, the clutch being of the so-called pull type, that is, it releases by the pulling out of the throw-out collar instead of the pushing in of the throw-out collar, as in the type shown in Figure 1. In the construction shown in Figure 5, the clutch is placed on the face plate upside-down. 25 designates the pressure ring; 26, the abutment or cover which has a hub 27; 28 are springs between the two elements 25 and 26. 29 is the throw-out sleeve and 30 the throw-out bearing. The cover or spring abutment 26 or the hub 27 thereof either thrusts directly against the face plate 1 or against blocks or spacers bolstering up the hub in order to give the throw-out sleeve freedom of movement during the compressing of the springs 28. The clamping member or spider 2 is mounted at the extreme upper end of the spindle and held in position by the U washer, as before, and the screw 3 operated to clamp the pressure ring 25 to take the load of the spring off the levers 31. While so clamped, these levers can be removed. Then the clamping member released gradually to entirely release the spring so that the parts of the clutch may be disassembled and any replacements made and then the clutch reassembled, the levers 31 being placed in position after clamping the pressure ring 25, as before, and then replacing the levers. The fulcrum bearings 32 for these levers are split bearings with one side removable for the purpose of removing and replacing the levers. In assembling a new clutch, the disassembling operation, of course, would not be used. The parts usually replaced are the pressure plate, levers, springs, release bearings and the throw-out sleeve. As in this type of clutch, the levers are not adjustable, there is no need for a gage performing the function of the gage 19 and the mounting therefor.

In Figure 6, another type of clutch is shown in which the levers are not adjustable and in which the pressure ring may be removed independently of the spring pressure. In the clutch shown in Figure 6, 40 is the spring abutment or cover; 41 the levers; 42 an adjustable cam plate threading into the cover 40, with which plate wedges 43 at the outer ends of the levers coact, these wedges being interposed between the plate 42 and the pressure ring not shown. The levers are pivoted at their inner ends at 44 to the throw-out sleeve 45 which is slidable in an inwardly extending hub on the spring abutment 40. 46 is the throw-out bearing. 47 is the clutch spring encircling the internal hub of the abutment and thrusting at its rear end against the abutment and at its other end against a collar at the inner end of the throw-out sleeve. In assembling or disassembling this type of clutch, the spring abutment 40 is bolstered up from the face plate by blocks 48 or other suitable bolsters. A clamping member, which in this case, is merely the U washer 2ª, is attached to the upper end of the spindle 3 and when the spindle or screw is operated, the washer thrusts against the upper or inner end of the throw-out sleeve, pushing it downwardly and relieving the levers of the spring action, and while so held, the levers can be removed, if the clutch is being disassembled, or placed in position, if a new clutch is being assembled. The bolster blocks 48 hold the spring abutment 40 high enough off the table to permit a sufficient clearance between the throw-out bearing 46 and the table to permit removal of the throw-out bearing. After the levers are removed, and the throw-out collar displaced, the spindle can be operated to release the spring until it is untensioned and then the entire clutch mechanism removed and any worn parts replaced.

In the form shown in Figure 7, the machine is shown as operating on another type of clutch in which 50 is the spring abutment; 51 the throw-out sleeve; 52 the clutch spring interposed between a collar at the outer or lower end of the sleeve and the abutment; and 53 the levers coacting at their inner ends with the throw-out sleeve and at their outer ends with a pressure ring, not shown, and near their outer ends fulcrumed or pivoted on the abutment 50. The clamping member, as 2, is mounted at the extreme upper end of the spindle or screw 3 with the bolsters 54 between the clamping member and the abutment 50. The throw-out sleeve at its lower end thrusts against the table 1, thus, when the screw is operated to clamp the member 2, the abutment 50 is moved downwardly relieving the levers of the spring pressure, so that they can be removed and thereafter the clamping member moved upwardly by means of the screw 8, to unload the spring, so that the parts can be removed and any worn parts replaced. The reverse of this operation takes place in assembling a new clutch or in reassembling a repaired clutch.

In Figure 8, the machine is shown as operating on a multiple disk clutch with no levers. 60 designates the spring abutment element; 61 the pressure element or inner drum; 62 the clutch spring interposed between these members. These two members are held assembled by the usual bolts 63; 64 is the throw-out collar connected to the head of the inner shiftable drum through which head the bolts extend. 65 is the outer drum of the clutch and 66 the interleaved disks between the two drums. The spring abutment 60 is bolstered from the face plate in any suitable manner, as by a spacer ring 67. The clamping member or washer 2ª is placed at the upper end of the spindle or screw 3, this thrusting against the throw-out collar 64 and when the screw is operated to clamp the member 2ª, the pressure ring 68 is shifted downwardly, thus unloading the bolts 63 from the spring pressure, so that the bolts 63 can be removed and the clutch disassembled and any replacements made and the clutch reassembled. A new clutch may be initially assembled in the reverse order by placing the bolts in position after the spring abutment 68 has been compressed against the spring.

In any form of the invention, the clutch is not subject to any rotary force during the compression of the spring or springs, and there is no mechanism above the table too obstruct the workmen while the clamping member is in position, that is, while removing levers and bolts, etc., owing to the fact that the operating member is below the table.

This machine is particularly rapid in operation, and quickly adapted to different sizes and types of clutches, so that it is equally adaptable for assembling clutches originally in production work, or in repair shops for adjusting and assembling clutches after being repaired.

What I claim is:

A machine for assembling clutches which include a pressure ring element, a spring abutment element, adjustable levers, and spring means thrusting in opposite directions against said elements, said machine comprising a face plate against which the pressure ring element is placed, a clamping member opposed to the face plate and engaging the abutment element and operable to compress the spring means, and means for actuating the clamping member including a non-rotatable endwisely movable spindle, in combination with a gage sleeve interchangeably mountable with the clamping member, on the spindle and thusting against the face plate and rotatable about the spindle, and a gage carried by and adjustable along the sleeve and having a finger for coacting with said sleeve, the sleeve being rotatable to bring the finger of the gage successively into engagement with the levers, the sleeve having a scale thereon to determine the position of the gage on the sleeve.

EARL R. FISH.